Feb. 4, 1941.           D. BRUCE              2,230,678
               DETACHABLE MAXIMUM POINTER UNIT
                     Filed Sept. 18, 1939
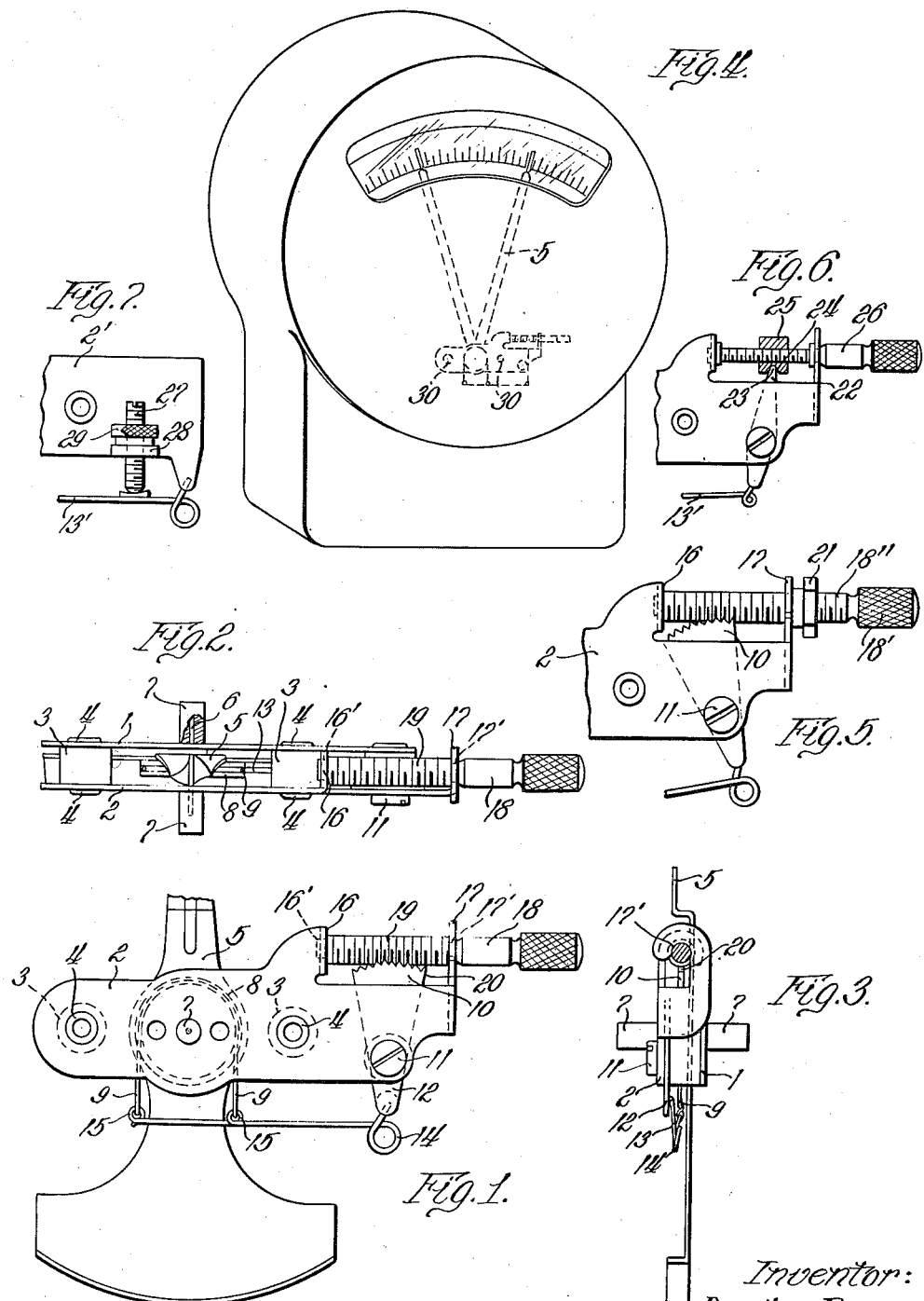
Inventor:
Douglas Bruce Patented Feb. 4, 1941

2,230,678

UNITED STATES PATENT OFFICE 2,230,678

DETACHABLE MAXIMUM POINTER UNIT

Douglas Bruce, Toronto, Ontario, Canada, assignor, by mesne assignments, to Sangamo Electric Company, Springfield, Ill., a corporation of Illinois Application September 18, 1939, Serial No. 295,370
In Canada May 30, 1939

5 Claims. (Cl. 116—129)

The principal objects of this invention are to ensure greater accuracy in the indication of maximum demand in electric meters and to provide a maximum demand pointer unit which may be accurately pre-adjusted as to frictional characteristics and which will be readily applicable to meters or other measuring devices as a complete unit either as a replacement or to adapt a measuring instrument to maximum indication.

A further and important object is to provide a simple but efficient form of friction means for holding the maximum pointer unit and an adjustment therefor which will form a permanent part of a supplemental indicating unit.

The principal feature of the invention resides in the novel construction of a maximum pointer unit provided with a friction holding means and a manually adjustable tensioning means mounted thereon whereby an accurate adjustment may be imparted prior to installation on a meter or other measuring device.

In the drawing Figure 1 is an enlarged front elevational view of a complete maximum pointer unit constructed in accordance with the present invention, the pointer being broken away in part.

Figure 2 is a plan view of the structure shown in Figure 1.

Figure 3 is an end elevational view with the adjusting screw in section.

Figure 4 is a perspective view of an electric meter illustrating in dotted lines the application of the present invention thereto.

Figure 5 is a fragmentary elevational view showing a locking means applied to the adjusting screw.

Figures 6 and 7 are fragmentary elevational views illustrating modified forms of adjustment.

In electric meters or other measuring devices employing a pointer or other displaceable indicator it is desirable to provide some indication as to the maximum demand indication or movement. It has been previously proposed to provide maximum demand pointers which were engaged by a movable pointer or other member and moved thereby to the maximum position reached by such pointer or member.

Frictional means was also provided for holding the maximum demand pointer in its various positions. In such prior constructions provision was also made for adjusting the value of the frictional holding means, but so far as I am aware such adjustment was dependent on the maximum demand element being mounted in position on the meter, and there was no means of accurately determining the value of the friction components prior to mounting the maximum demand element in place on the measuring instrument.

The present invention has been devised to overcome these difficulties, and in the form of construction illustrated in Figures 1, 2 and 3 I provide a light metal frame composed of sections 1 and 2 having tubular spacers 3, the ends 4 of which are tubular-riveted.

A maximum demand pointer 5 is mounted between the frame sections 1 and 2 on pin extensions 6 which extend into bearings 7 secured and extending from the frame sections 1 and 2.

A grooved friction hub 8 presenting a highly polished periphery is connected with the pointer 5 about which a looped length of silk 9 or other suitable material is applied.

A sector member 10 is mounted on a pivot screw 11 and secured to the lower end 12 thereof is a length of spring wire 13 or the like, here shown looped at 14 to increase the resiliency and also looped at the points 15 to form eyes through which the ends of the friction-applying means 9 are inserted and suitably secured.

Lugs 16 and 17 are formed in the frame section 2 having bearing recesses 16' and 17' which open inwardly toward the sector member 10. An adjusting screw 18 is provided with reduced portions for engagement in the bearing recesses 16' and 17' and the intervening threaded portion 19 engages the toothed portion 20 of the sector, so that by rotation of the screw 18 the spring element 13 may be accurately tensioned.

In this way the frictional resistance to rotation of the hand 5 may be very accurately regulated and it is important to note that the adjustment or regulation of the frictional value is effected by means which is a permanent part of the demountable frame unit carrying the maximum demand hand, so that in production of a definite predetermined frictional resistance may be imparted to the hand 5 which may then be applied directly to a meter or other device, or may be forwarded in its pre-adjusted condition for application to a meter or other device already in service, either as a means of adapting such meter or mechanism to the indication of maximum demand or to replace a previously installed maximum demand unit which may have become defective or require reconditioning.

The opening of the bearing recesses 16' and 17' inwardly provides a convenient arrangement for assembly, since the adjusting screw 18 may be first slipped laterally into the bearing sockets, after which the sector 10 will be placed in position on the screw 11 and this will retain the adjusting screw against lateral displacement from the bearing.

In practise the screw 11 may advantageously be arranged as a clamping means so that once the desired adjustment of a sector is obtained the latter may be clamped firmly in place by the screw 11.

In Figure 5 the adjusting screw 18' is shown provided with a threaded portion 18" on which is threaded a clamping nut 21 adapted to bear against the bearing lug 17 after the screw 18' has been properly adjusted.

In the modification shown in Figure 6 the sector is replaced by a lever member 22, the lower end of which is connected to the spring element 13' and the upper end is provided with a ball-like portion 23 which engages in a socket 24 formed in a nut 25 threaded on the adjustable spindle 26.

In Figure 7 adjustment of the tension of the element 13' is effected by direct application of pressure thereto by an adjustable screw 27 threaded in a lug 28 of the frame section 2', and a clamping nut 29 co-operates with the lug 28 to preserve the adjustment.

The construction defined is quite simple but represents an efficient combination and the device in its entirety may be readily mounted in position on a meter or other recording structure by simply inserting a pair of mounting screws 30 through the tubular members 3 to clamp the device in place.

What I claim as my invention is:

1. As an article of manufacture, an adjustable maximum pointer assembly for interchangeably mounting as a self-contained unit in cooperative relation on measuring instruments adapted to receive the same comprising, a frame formed by a pair of plate-like members having registering apertures therein, tubular rivets in said apertures connecting said plates and acting to prevent separation thereof, spacer means between said plates acting to prevent movement thereof toward each other, said tubular rivets and apertures in said plates being arranged and adapted to receive therethrough holding means for mounting said frame on an instrument, a displaceable maximum indicator rockably mounted between said members, means carried by said frame for frictionally opposing displacement of said maximum indicator, and means also carried by said frame for varying the friction applied to said indicator by said means.

2. As an article of manufacture an adjustable maximum pointer assembly for interchangeably mounting as a self-contained unit in cooperative relation on measuring instruments adapted to receive the same comprising, a frame formed by a pair of plate-like members having registering apertures therein, tubular rivets in said apertures connecting said plates and acting to prevent separation thereof, spacer means between said plates acting to prevent movement thereof toward each other, said tubular rivets and apertures in said plates being arranged and adapted to receive therethrough holding means for mounting said frame on an instrument, a displaceable maximum indicator rockably mounted between said members, means carried by said frame for frictionally opposing displacement of said maximum indicator and including a tension member, a lever pivotally mounted between said members and connected to said tension member, spaced apart parallel lugs integrally formed with said members and having registering apertures, and adjusting means mounted in said apertures in said lugs and operatively connected to said lever for moving said tension member to vary the friction applied to said indicator.

3. As an article of manufacture an adjustable maximum pointer assembly for interchangeably mounting as a self-contained unit in cooperative relation on measuring instruments adapted to receive the same comprising, a frame formed by a pair of plate-like members having registering apertures therein, tubular rivets in said apertures connecting said plates and acting to prevent separation thereof, spacer means between said plates acting to prevent movement thereof toward each other, said tubular rivets and apertures in said plates being arranged and adapted to receive therethrough holding means for mounting said frame on an instrument, a displaceable maximum indicator rockably mounted between said members, means carried by said frame for frictionally opposing displacement of said maximum indicator and including a tension member, a sector member pivotally mounted between said members and connected to said tension member, and a spindle adjustably mounted on said frame and threadedly engaging said sector member for oscillating the same to adjust the tension of said tension member for varying the friction opposing displacement of said maximum indicator.

4. As an article of manufacture an adjustable maximum pointer assembly for interchangeably mounting as a self-contained unit in cooperative relation on measuring instruments adapted to receive the same comprising, a frame formed by a pair of plate-like members having registering apertures therein, tubular rivets in said apertures connecting said plates and acting to prevent separation thereof, spacer means between said plates acting to prevent movement thereof toward each other, said tubular rivets and apertures in said plates being arranged and adapted to receive therethrough holding means for mounting said frame on an instrument, a displaceable maximum indicator rockably mounted between said members, means carried by said frame for frictionally opposing displacement of said maximum indicator and including a tension member, a lever pivotally mounted between said members and connected to said tension member, a threaded spindle adjustably mounted on said frame, and a nut threadedly engaging said spindle and operatively engaging said lever to rock the same for adjusting the tension of said tension member to vary the friction opposing displacement of said maximum indicator.

5. As an article of manufacture an adjustable maximum pointer assembly for interchangeably mounting as a self-contained unit in cooperative relation on measuring instruments adapted to receive the same comprising, a frame formed by a pair of plate-like members having registering apertures therein, tubular rivets in said apertures connecting said plates and acting to prevent separation thereof, spacer means between said plates acting to prevent movement thereof toward each other, said tubular rivets and apertures in said plates being arranged and adapted to receive therethrough holding means for mounting said frame on an instrument, a displaceable maximum indicator rockably mounted between said members, means carried by said frame for frictionally opposing displacement of said maximum indicator and including a tension member, and an adjusting screw threadedly mounted on said frame and operatively connected to said tension member for adjusting the tension thereof to vary the friction opposing displacement of said maximum indicator.

DOUGLAS BRUCE.